United States Patent [19]

Stroehlein

[11] Patent Number: 5,706,354
[45] Date of Patent: Jan. 6, 1998

[54] AC LINE-CORRELATED NOISE-CANCELING CIRCUIT

[76] Inventor: Brian A. Stroehlein, 551 Milton Rd., Litchfield, Conn. 06759

[21] Appl. No.: 500,259

[22] Filed: Jul. 10, 1995

[51] Int. Cl.$^6$ .................................................. H04B 15/00
[52] U.S. Cl. ............................ 381/94; 381/71; 381/104; 381/107
[58] Field of Search .......................... 381/71, 94, 104, 381/107; 364/724.01, 724.12, 724.14, 724.17, 724.19

[56] References Cited

U.S. PATENT DOCUMENTS

| | | | |
|---|---|---|---|
| 4,093,923 | 6/1978 | McCormick | 328/165 |
| 4,420,815 | 12/1983 | Francis | 364/724 |
| 4,759,071 | 7/1988 | Heide | 381/106 |
| 4,989,179 | 1/1991 | Simko . | |
| 5,129,003 | 7/1992 | Saruta | 81/71 |
| 5,259,033 | 11/1993 | Goodings et al. | 381/71 |
| 5,406,149 | 4/1995 | An et al. . | |
| 5,499,301 | 3/1996 | Sudo et al. | 381/71 |
| 5,533,136 | 7/1996 | Smith | 381/107 |

Primary Examiner—Curtis Kuntz
Assistant Examiner—Duc Nguyen

[57] ABSTRACT

A device is connected in a signal path for canceling an unwanted noise signal induced by and correlated to the AC power line. The noise signal is assumed to have relatively constant phase (with respect to the AC power line) and amplitude during the period of use. The desired signal is assumed to be temporarily mutable for a brief period during which the noise signal is acquired. A manually- or automatically-adjusted gain (or attenuation) stage and over-load detector are at the front-end of the waveform acquisition/playback block. A manually- or automatically-adjusted stage, typically linked to the earlier gain (attenuation) stage and with complementary attenuation (or gain) is at the back-end of the waveform acquisition/playback block. In this way, maximum performance can easily be realized from a waveform acquisition/playback block of lower resolution over a wide range of noise signal levels. The device acquires N samples of the noise signal over one or more periods of the AC power cycle and in synchrony with the AC power cycle. The sampling is terminated and the stored signals are played back with the correct amplitude and summed 180 degrees out-of-phase with the original noise signal.

11 Claims, 8 Drawing Sheets

5,706,354

AC LINE-CORRELATED NOISE-CANCELING CIRCUIT

CROSS REFERENCES TO RELATED APPLICATIONS

None.

BACKGROUND—FIELD OF INVENTION

This invention relates to a circuit for canceling a noise signal that occurs in an electrical signal while preserving the desired signal having the same frequency as the noise signal.

BACKGROUND—DESCRIPTION OF PRIOR ART

The present invention is useful only in canceling a noise signal which has a constant phase and amplitude. This type of noise signal occurs in many electrical signals as a result of the power distribution system of a country, and of the various transducers and system layouts which are by design susceptible to this noise.

This noise occurs, for example, in electric musical instruments (e.g. electric guitars) and sound systems used for recording or amplifying performances. In these cases, the frequencies of interest, i.e. the audio band (20 Hz to 20 kHz) include the 60 Hz (or 50 Hz) power line frequency and correlated harmonics. Several mechanisms exist by which AC line-correlated noise may be introduced into an electrical signal, including inductive pickup and ground loops.

Several circuits have been suggested for solving the problem of AC line-correlated noise being superimposed on the signals of interest. Some systems rely upon the use of notch filters which are adjusted to filter-out the noise. While this is a satisfactory solution to the problem of the AC line-correlated noise, it also removes audio information which is of interest. In addition, it also introduces distortion in the form of undesirable phase-shift artifacts to the frequencies that remain. An additional problem with this technique is that it does not adequately address field-powered (i.e. local power generation) applications where the line frequency may vary somewhat from moment to moment. In this case, the solution would be to widen the notch, which worsens the effect of the inherent drawbacks.

Another device commonly used to address this problem in musical instrument and professional sound applications is the noise gate. These can be fairly sophisticated devices whose function is to alter the output amplitude of one or more frequency bands of a signal based on the input amplitude. These devices, however, introduce their own amplitude distortion artifacts.

Other solutions include expensive adaptive canceling devices based on digital signal processors, and passive or active line-balancing devices which address only some mechanisms by which this noise is introduced.

The McCormick patent titled "Signal Cancelling Circuit" (U.S. Pat. No. 4,093,923) specifically discloses and claims a method and system for canceling a noise signal while preserving a desired signal of the same frequency. The method and system, however, contemplate transducers and signal levels which are very predictable, namely, geophones used in seismic surveys. Because of this, the need to provide gain/attenuation scaling at the input and output of the waveform acquisition/playback block in other applications was overlooked. This scaling helps the operator realize the maximum performance of the device with a variety of transducers and signal levels with a minimum investment in the waveform acquisition/playback block. In addition, the McCormick patent does not contemplate the elimination of phase and amplitude distortions typical of common solutions used in musical instrument and professional audio applications. Nor does it appear to recognize the ground loop mechanism, uncommon in geophone applications, as one which can be overcome by the device. Several circuits have been suggested for solving the problem of 50- or 60-cycle power supply signals being superimposed on the audio signals of interest. Some systems rely on the use of notch filters or comb filters which are adjusted to filter out the 50- or 60-cycle signals and their harmonics. While this is a satisfactory solution to the problem of the 50 or 60 Hz related noise, it also removes 50 or 60 Hz audio signals and their harmonics which are of interest. It can also introduce undesired phase shifts in the audio frequency range.

Other systems perform adaptive cancellation: an approach which is far more hardware-intensive, thus more costly, than the present invention. Adaptive cancellation can have undesired side-effects which may be audible.

Still other systems include transformer-coupled passive devices which simply break "ground loops," which are closed conductive paths intersected by power line-related magnetic fields. These devices are not effective against other common means by which power line noise enters audio signal paths. In addition, transformers have a reputation in the professional audio market as being prone to generating undesired, audible side-effects.

OBJECTS AND ADVANTAGES

Accordingly, several objects and advantages of my invention are to provide an AC power line noise canceling circuit which obviates the disadvantages of previous circuits, specifically which is of a "feed-forward" design familiar to users of audio signal processors, which is a less hardware-intensive thus lower-cost design, which can effectively cancel stable (relatively constant phase and amplitude) line noise waveforms regardless of how introduced to the audio signal, which introduces no audible side-effects, and which has adjustable gain at the front- and back-end of the waveform acquisition block for maximizing its effectiveness at and economy of noise cancellation.

Still further objects and advantages will become apparent from a consideration of the ensuing description and accompanying drawings.

Reference Numerals

Figure 1:
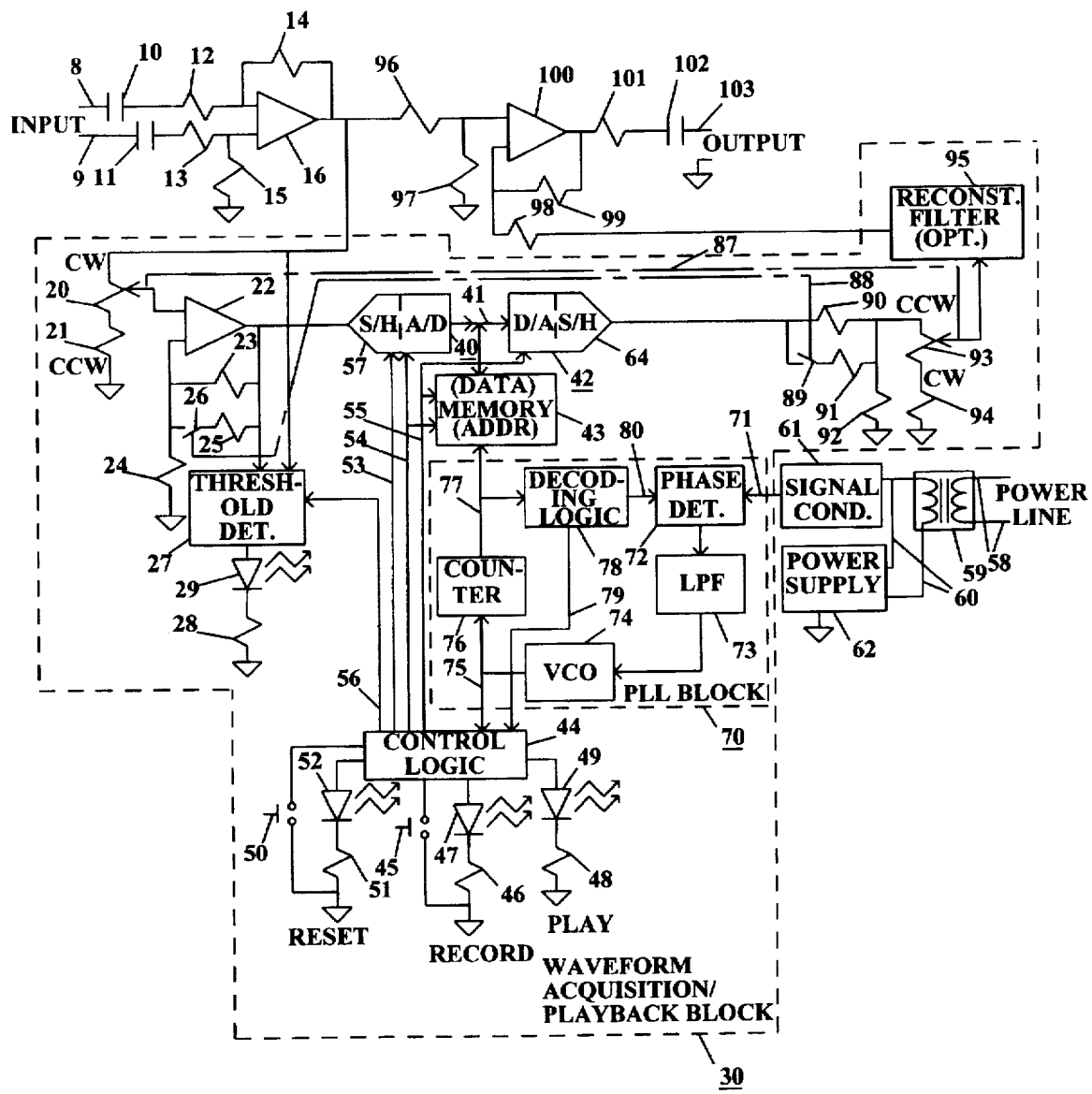
FIG. 1 is a block diagram of the preferred embodiment of the device.

| | |
|---|---|
| 8 | Conductor (signal input) |
| 9 | Conductor (signal input) |
| 10 | Capacitor |
| 11 | Capacitor |
| 12 | Resistor |
| 13 | Resistor |
| 14 | Resistor |
| 15 | Resistor |
| 16 | Amplifier |
| 20 | Potentiometer |
| 20A | Gain/attenuation block |
| 21 | Resistor |
| 22 | Amplifier |
| 23 | Resistor |
| 24 | Resistor |
| 25 | Resistor |
| 26 | Switch |
| 26A | Switch block |
| 27 | Threshold detector |
| 27A | Threshold detector |
| 28 | Resistor |
| 29 | Threshold LED |
| 30 | Waveform acquisition/playback block |
| 40 | Analog-to-digital converter |
| 41 | Data bus |
| 42 | Digital-to-analog converter |
| 43 | Memory |
| 44 | Control logic |
| 44A | Control logic |
| 45 | Record pushbutton |
| 45B | Record pushbutton |
| 46 | Resistor |
| 47 | Record LED |
| 48 | Resistor |
| 49 | Playback LED |
| 50 | Reset pushbutton |
| 50B | Reset pushbutton |
| 51 | Resistor |
| 52 | Reset LED |
| 53 | Start conversion control signal |
| 54 | Write-to-memory control signal |
| 55 | Read from memory control signal |
| 56 | Threshold detector control signal |
| 57 | Sample-and-hold amplifier |
| 58 | Power line input |
| 59 | Transformer |
| 60 | Stepped-down power line signal |
| 61 | Signal conditioning block |
| 62 | Power supply |
| 63 | Over/under threshold signal |
| 70 | Phase-locked loop block |
| 71 | Conditioned power line signal |
| 72 | Phase detector |
| 73 | Low-pass filter |
| 74 | Voltage-controlled oscillator |
| 75 | Voltage-controlled oscillator output |
| 76 | Counter |
| 77 | Address bus |
| 78 | Decoding logic |
| 79 | Decoding logic control signals |
| 80 | Input (of phase detector 72) |
| 87 | Linkage |
| 87A | Control bus |
| 87B | Control bus |
| 88 | Linkage |
| 88A | Control bus |
| 88B | Control bus |
| 89 | Switch |
| 89A | Switch block |
| 90 | Resistor |
| 91 | Resistor |
| 92 | Resistor |
| 93 | Potentiometer |
| 93A | Gain/attenuation block |

-continued

| | |
|---|---|
| 94 | Resistor |
| 95 | Optional reconstruction filter |
| 96 | Resistor |
| 97 | Resistor |
| 98 | Resistor |
| 99 | Resistor |
| 100 | Amplifier |
| 101 | Optional resistor |
| 102 | Optional capacitor |
| 150 | Device |
| 151 | Electric guitar |
| 152 | Compression box |
| 153 | Distortion box |
| 154 | Flanger box |
| 155 | Guitar amplifier |
| 160 | AC outlet |
| 161 | AC outlet |
| 163 | Mixing board |
| 164 | Public address amplifier |
| 201 | Power-on reset interrupt |
| 202 | Reset pushbutton interrupt |
| 210 | State |
| 220 | State |
| 230 | State |
| 240 | Record idle state |
| 250 | Record pushbutton interrupt |
| 260 | State |
| 270 | State |
| 280 | Gain/attenuation adjustment state |
| 290 | State |
| 300 | Threshold interrupt |
| 310 | State |
| 315 | State |
| 320 | State |
| 330 | Record idle state |
| 340 | Record state |
| 345 | State |
| 350 | Line frequency interrupt A |
| 355 | State |
| 360 | State |
| 370 | State |
| 380 | Playback state |
| 385 | Playback sample remainder delay state |
| 390 | Line frequency interrupt B |
| 400 | Playback idle state |

PREFERRED EMBODIMENT—DESCRIPTION

The circuit of the present invention is only useful in removing a noise signal that has a substantially constant phase and amplitude. When the noise signal results from power line-related interference with a desired audio signal, one can generally assume that the power line noise will remain constant in phase and amplitude. In the case of the recording session or live performance where the noise may change after a time, the operator may simply re-adjust and re-acquire the new noise signal and resume. The circuit is expected to be useful in many applications despite this limitation, primarily because of its performance-vs.-cost compared to alternative solutions.

Referring to FIG. 1, there is shown at 8 and 9 two conductors which form the differential ("balanced") signal input from which it is desired to remove the unwanted power line noise. In some instances, conductor 9 may be shorted to signal ground by the input device, its cable, or internal connection, effecting a single-ended ("unbalanced") amplifier stage. Optional capacitors 10 and 11 provide for DC blocking. Resistors 12, 13, 14, and 15 and amplifier 16 comprise the input amplifier stage.

The output of the input amplifier stage is split to resistor 96 and potentiometer 20. Resistors 96 and 97 form the non-inverting input to the output amplifier stage, which also includes resistors 98 and 99, and amplifier 100.

The following several paragraphs discuss just one of many possible implementations of a waveform acquisition/ playback block 30. It is contemplated that any combination of circuitry and/or software capable of synchronously acquiring, storing, and synchronously playing-back an noise signal with adequate bandwidth and resolution would suffice, including blocks employing less-conventional analog-to-digital conversion schemes, an "analog EEPROM" system, digital phased-locked loops, systems based on conventional microprocessors or microcontrollers, systems based on DSP microprocessors or microcontrollers, etc.

The waveform acquisition/playback block 30 begins with an attenuation stage. Potentiometer 20, typically an audio taper type, enables gain adjustment (attenuation) of the noise signal entering the waveform acquisition/playback block 30. Resistor 21 puts a lower limit on the amount of attenuation of the input signal by potentiometer 20, making it less sensitive to small changes in adjustment at far counterclockwise (high attenuation) settings, thus easier to set.

Amplifier 22, resistors 23, 24, and 25, and switch 26 comprise a gain stage for raising the noise signal to a level compatible with the input range of the waveform acquisition/playback block 30. Additional gain can be obtained by opening switch 26.

The threshold detector 27 gives an indication via resistor 28 and light emitting diode (LED) 29 as to whether the noise signal level into the waveform acquisition block 30 is excessive. Alternatively, when the state of the threshold detector control signal 56 is changed, it can give an indication as to whether the level of the input signal is excessive when the device is in playback mode.

It is contemplated that potentiometer 20 and switch 26 could be set manually or automatically by the control logic 44 checking for correct noise signal level via threshold detector 27. The manually-adjusted implementation is shown in FIG. 1.

The output of amplifier 22 is passed to analog-to-digital converter 40. One conversion is initiated each time the start conversion control signal 53 is asserted by the control logic 44. (In this implementation, the analog-to-digital converter 40 includes its own integrated sample-and-hold amplifier 57.) The digital result of the conversions (samples) are written from the analog-to-digital converter 40 to the memory 43 via the data bus 41 each time the control logic 44 asserts the write-to-memory control signal 54. A stored sample is written from the memory 43 to the digital-to-analog converter 42 via the data bus 41 each time the control logic 44 asserts the read-from-memory control signal 55.

Synchronization of the waveform acquisition/playback block 30 to the power line signal is accomplished via a phase-locked loop block 70. A conditioned power line signal 71 (which may be conditioned for amplitude, wave shape, and noise) is provided to an input of the phase detector 72. The output error signal from the phase detector 72 is fed to the low-pass filter 73 for smoothing. The essentially dc output of the low-pass filter is fed to the input of the voltage-controlled oscillator 74. The voltage-controlled oscillator 74 generates an output 75 which is a synchronous multiple of the conditioned power line signal 71. The voltage-controlled oscillator output 75 is used by the control logic 44, along with decoding logic control signals 79, to synchronize recording (via start conversion control line 53 and write-to-memory control line 54) and playback (via read-from-memory control line 55) of the noise signal to the conditioned power line signal 71. The voltage-controlled oscillator output 75 is also used to increment the counter 76 which generates sequential addresses to the memory 43 via the address bus 77. The address bus 77, or just a portion of it, is fed to the decoding logic 78, which supplies a signal of correct frequency and phase to an input 80 of the phase detector 72. The decoding logic 78 also generates decoding logic control signals 79 for use by the control logic 44 to synchronize recording and playback of the noise signal to the conditioned power line signal 71.

The reset pushbutton 50 causes the control logic block 44 to place the circuit into its idle state. The control logic block 44 gives an indication via resistor 51 and light emitting diode 52 when the circuit is in its idle state. The record pushbutton 45 causes the control logic block 44 to place the circuit into an acquisition state. The control logic block 44 gives an indication via resistor 46 and light emitting diode 47 when the circuit is in the acquisition state. When acquisition of the noise signal is complete, the control block 44 automatically switches the circuit into the playback state, and gives an indication of playback mode via resistor 48 and light emitting diode 49.

The output of the digital-to-analog converter 42 is fed to a voltage divider attenuation stage comprised of a switch 89 and resistors 90, 91, and 92. Additional attenuation is obtained by opening the switch 89. The voltage divider output is fed to a second stage of attenuation provided by a potentiometer 93 and resistor 94.

Potentiometer 93, typically a reverse audio taper type, enables gain adjustment (attenuation) of the captured noise signal leaving the waveform acquisition/playback block 30. Resistor 94 puts a lower limit on the amount of attenuation of the captured noise signal by potentiometer 93, making it less sensitive to small changes in adjustment at far clockwise (low attenuation) settings, thus easier to set.

It is contemplated that potentiometer 93 and switch 89 could be set manually or automatically by the control logic 44 checking the waveform acquisition/playback block 30 input for correct noise signal level via threshold detector 27. The manually-adjusted implementation is shown in FIG. 1.

Adjustment of potentiometers 20 and 93 occurs simultaneously via linkage 87. The potentiometers are linked so that a reduction of attenuation through potentiometer 20 produces an equal decibel increase in attenuation through potentiometer 93. Adjustment of switches 26 and 89 occurs simultaneously via linkage 88. The switches are linked so that an increase in gain produced by opening switch 26 is matched by an equal decibel increase in attenuation from opening switch 89. In this way, the performance of the waveform acquisition/playback block 30 can be maximized for a wide range of interference signal levels, while simultaneously the correct playback level for the acquired noise signal can be set. In the case of the manually-adjusted implementation of FIG. 1, the linkages 87 and 88 would typically be mechanical. In the case of the automatically-adjusted implementation, the linkages 87 and 88 would typically be electronic, as would likely be the potentiometers 20 and 93, and switches 26 and 89.

A stepped-down power line signal 60 is provided via the power line input 58 and transformer 59. The stepped-down power line signal 60 may be conditioned for amplitude, wave shape, and noise by the signal conditioning block 61 into the conditioned power line signal 71 for use by an input to the phase detector 72. The stepped-down power line signal 60 may also be used for supplying power to the circuit via power supply 62.

The output of the attenuator formed by potentiometer 93 and resistor 94 may be fed to an optional reconstruction filter 95 depending on such factors as the sample rate used, the bandwidth of the desired signal, the desired degree of noise signal rejection, and the quality and design of the digital-to-analog converter 42 used. The optional reconstruction filter 95 compensates for the high-frequency roll-off inherent in some digital-to-analog conversion processes.

Resistors 96, 97, 98, and 99, and amplifier 100 form a differential output amplifier stage for combining the input signal from amplifier 16 with the acquired interference signal from the optional reconstruction filter 95. The input signal, which in operation consists of the desired signal with superimposed noise signal, enters the non-inverting side of the amplifier, while the acquired noise signal enters the inverting side of the amplifier stage, that is, it is summed 180 degrees out of phase and with the same amplitude as the superimposed noise in the buffered input signal, causing the two to cancel.

Optional resistor 101 provides short-circuit protection and optional capacitor 102 provides dc blocking for the output of amplifier 100.

Preferred Embodiment—Operation

Figure 7:
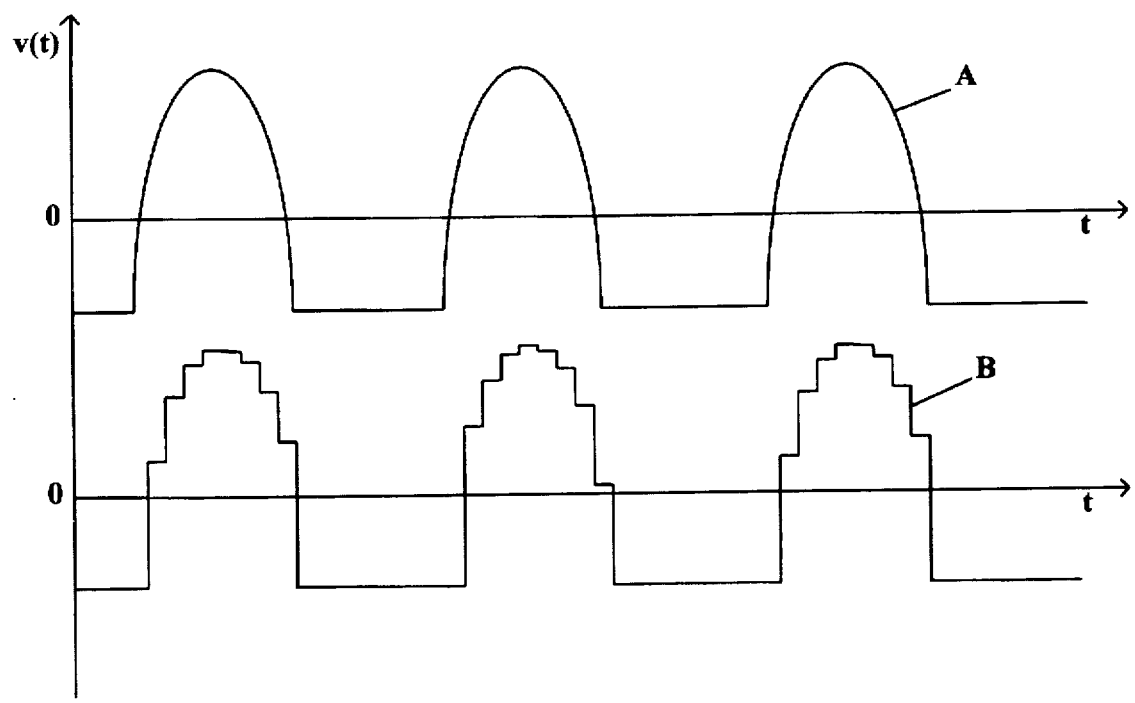
FIG. 7 shows two waveforms illustrating the actual noise signal and the feedforward signal reconstructed from the stored instantaneous values of the noise signal.

The device functions effectively as follows: The user first identifies an audio signal path in need of noise reduction, specifically, AC power line-related noise commonly referred to as "hum," "buzz," or "hash," as typified by the waveform illustrated in Curve A of FIG. 7. The user then breaks the signal path as close to the point of introduction of the noise as possible, and inserts the device. Two common examples will serve to illustrate.

Figure 2:
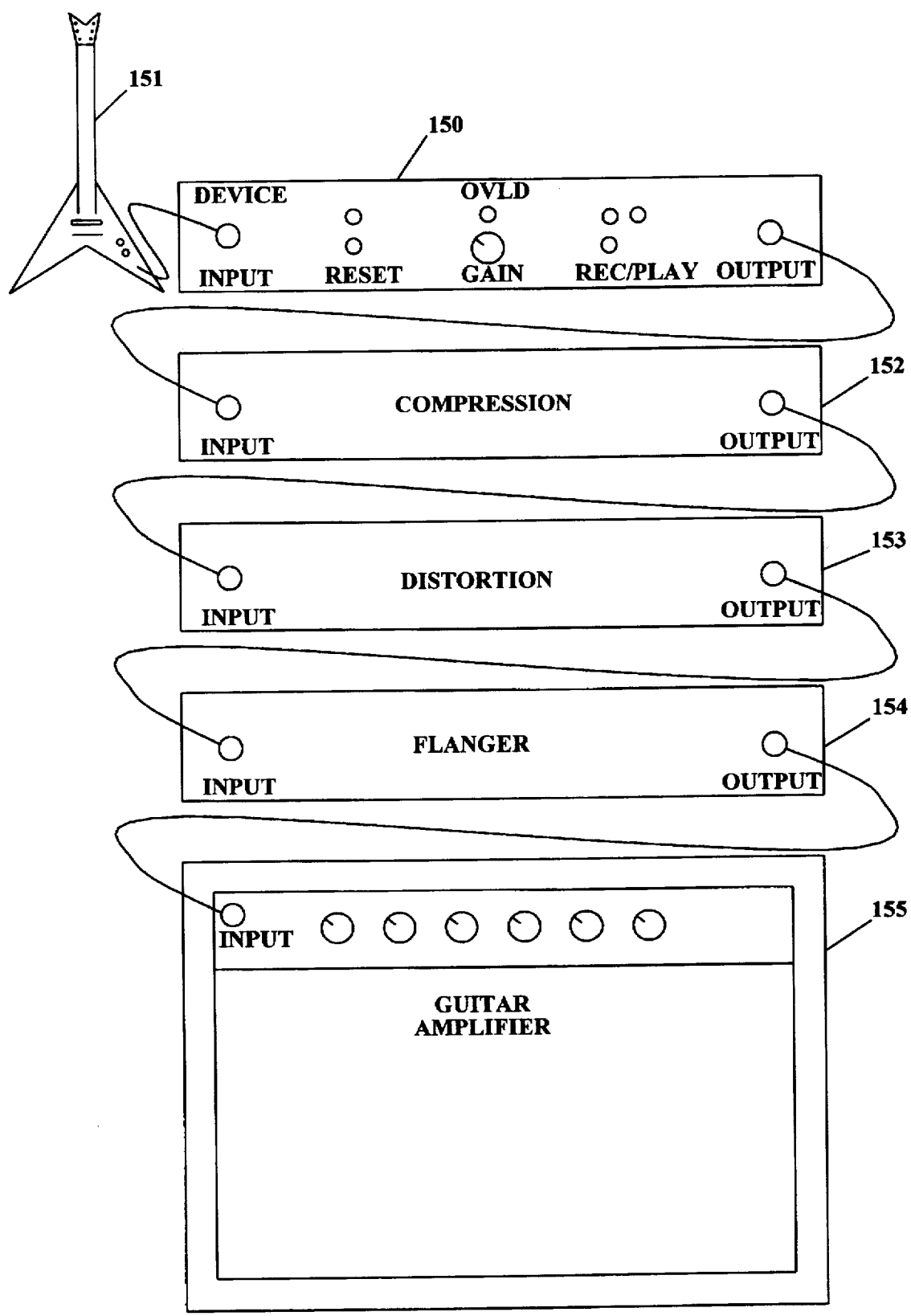
FIG. 2 shows an application in which the device is used to cancel AC line noise from an electric guitar's magnetic coil pickup.

In the first example of FIG. 2, a musician plugs the output of his electric guitar 151 into the input of the device 150, and the output of the device 150 into a sequential string of "effects boxes" such as compression 152, distortion 153, and flanger 154 devices, and finally into his guitar amplifier 155. Because the guitar 151 itself was the point of introduction for the AC power line-related noise (a common occurrence, since electric guitars have magnetic coil pickups, and many guitar amplifiers are good magnetic field generators), he inserts the device 150 into the signal path just after the guitar 151. By doing this, he realizes maximum benefit from the device 150, because the noise is eliminated before the "effects boxes" 152, 153, 154 were able to introduce time-variant amplitude and phase distortions to the noise for which the device 150 cannot compensate. The device effectively cancels-out the noise, leaving only the desired signal from the guitar.

An additional benefit realized by the user may involve safety. Oftentimes musicians, in an effort to rid their setups of AC power line-related noise, resort to "floating" their amplifiers and other equipment; that is, using 2-to-3-prong outlet adapters with the ground lead disconnected as "ground lifters." Although this practice helps alleviate the noise, it also gives rise to the possibility that a faulty amplifier 155 or other equipment will create a shock hazard. The device 150 eliminates the noise without having to resort to this dangerous practice.

Figure 3:
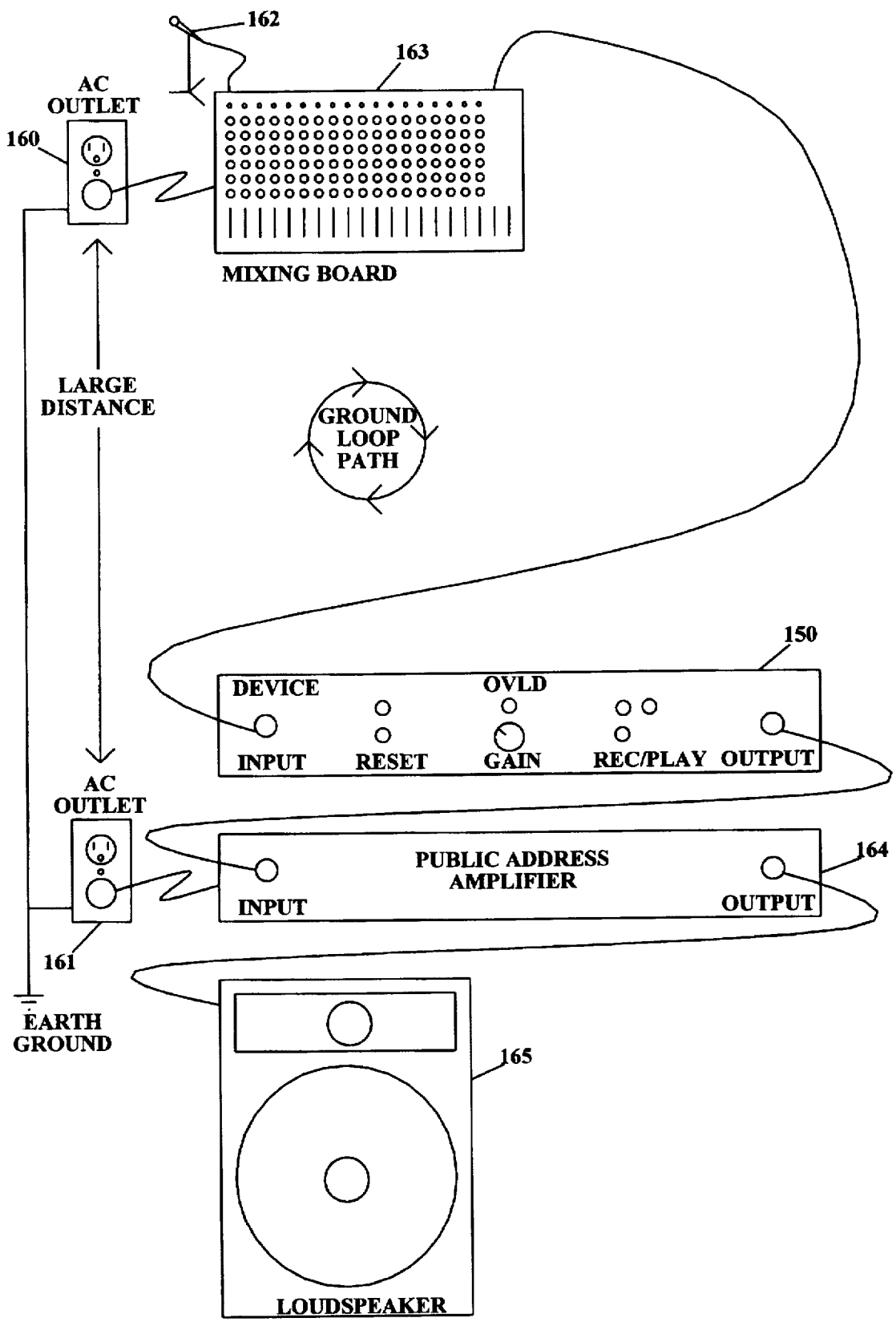
FIG. 3 shows an application in which the device is used to cancel AC line noise generated by a ground loop inherent in a sound system layout.

In the second example of FIG. 3, a sound engineer setting up a recording session or a live sound system encounters a "ground loop," a useful configuration of dispersed equipment that nevertheless creates a loop which is cut by stray magnetic fields from the AC power line, setting up an alternating current, thus, due to IR drops in the wire, an alternating voltage on signal lines. In this example, the mixing board 163 is located some distance away from the public address amplifier 164. Likewise, their respective AC outlets 160 and 161 are also located some distance away from each other. The physical separation of mixing board 163 from public address amplifier 164 gives rise to a potential ground loop as shown. In this example, both the mixing board 163 and the public address amplifier 164 can potentially manifest AC line-correlated noise voltages in their outputs due to the ground loop, and the device 150 would be best located nearest the public address amplifier 164, at the end of the chain of likely contributors to AC line noise.

Referring back to FIG. 1, once the device 150 has been inserted into the signal path, the user temporarily silences the "desired" component of the signal, allowing only the noise signal to be heard. He then rotates the knob connected to potentiometers 20 and 93 via linkage 87 clockwise (CW) from a full-counterclockwise (CCW) position until the threshold LED 29 lights, then slowly counterclockwise until it just goes out. If threshold LED 29 does not light over the full range of adjustment, he may increase the gain to the waveform acquisition/playback block 30 by opening the range switches 26 and 89 connected via linkage 88. Rotating the knob to potentiometers 20 and 93 clockwise (or opening the range switches 26 and 89) has the effect of increasing the amplitude of the noise signal into the waveform acquisition/playback block 30, and simultaneously decreasing the amplitude of the acquired noise signal following the block. The result of this is that with the gain knob and range switch properly set, the full dynamic range of the waveform acquisition/playback block 30 can be utilized, and the acquired noise signal re-enters the "main" signal path with the same amplitude as the original, but 180 degrees out of phase so as to cancel the noise.

With the knob and switch properly set, the user presses the "record" pushbutton 45. The control logic 44 then initiates the acquisition of the noise waveform. The phase-locked loop (PLL) block 70 generates a correlated integral multiple of the AC power line frequency input to it via the signal conditioning block 61. This multiple, defined by the counter 76 and decoding logic 78, and found at the VCO output 75, sets the sampling rate for the waveform acquisition block 30. The control logic 44 sequences the timing of the analog-to-digital converter 40 acquisitions and writes to the memory 43. For a single-channel device, one acquisition and memory write are performed for each pulse from the VCO 74. Waveform acquisition continues until the requisite number of samples have been acquired, as defined by the decoding logic block 78.

After waveform acquisition is complete, the device automatically switches to "play" mode and continuously replays the stored waveform by writing from the memory 43 to the digital-to-analog converter 42 at the same line-correlated sampling rate. The waveform is attenuated to the proper level by the attenuation stages consisting of resistors 90, 91, 92, and 94, range switch 89, and potentiometer 93. It is then frequency-equalized (with "sin x/x correction") by the optional reconstruction filter 95. The reconstructed waveform (with "sin x/x correction" omitted) is illustrated in Curve B of FIG. 7, and will seem to be formed by a series of step voltages. While this signal does not exactly match the unwanted power line noise, it approaches its shape, and effectively cancels it from the desired signal.

Finally, the waveform is added back to the original noise signal with the proper gain, but 180 degrees out-of-phase, at the output amplifier stage consisting of resistors 96, 97, 98, and 99, and amplifier 100. Thus, the power line-correlated noise is canceled.

At this point, the user may turn the "desired" signal back on and proceed with his work. If at any time conditions change and correlated noise is once again present, he may simply repeat the above procedure.

Other Embodiments

Automatic Gain Adjustment—Description

Figure 4:
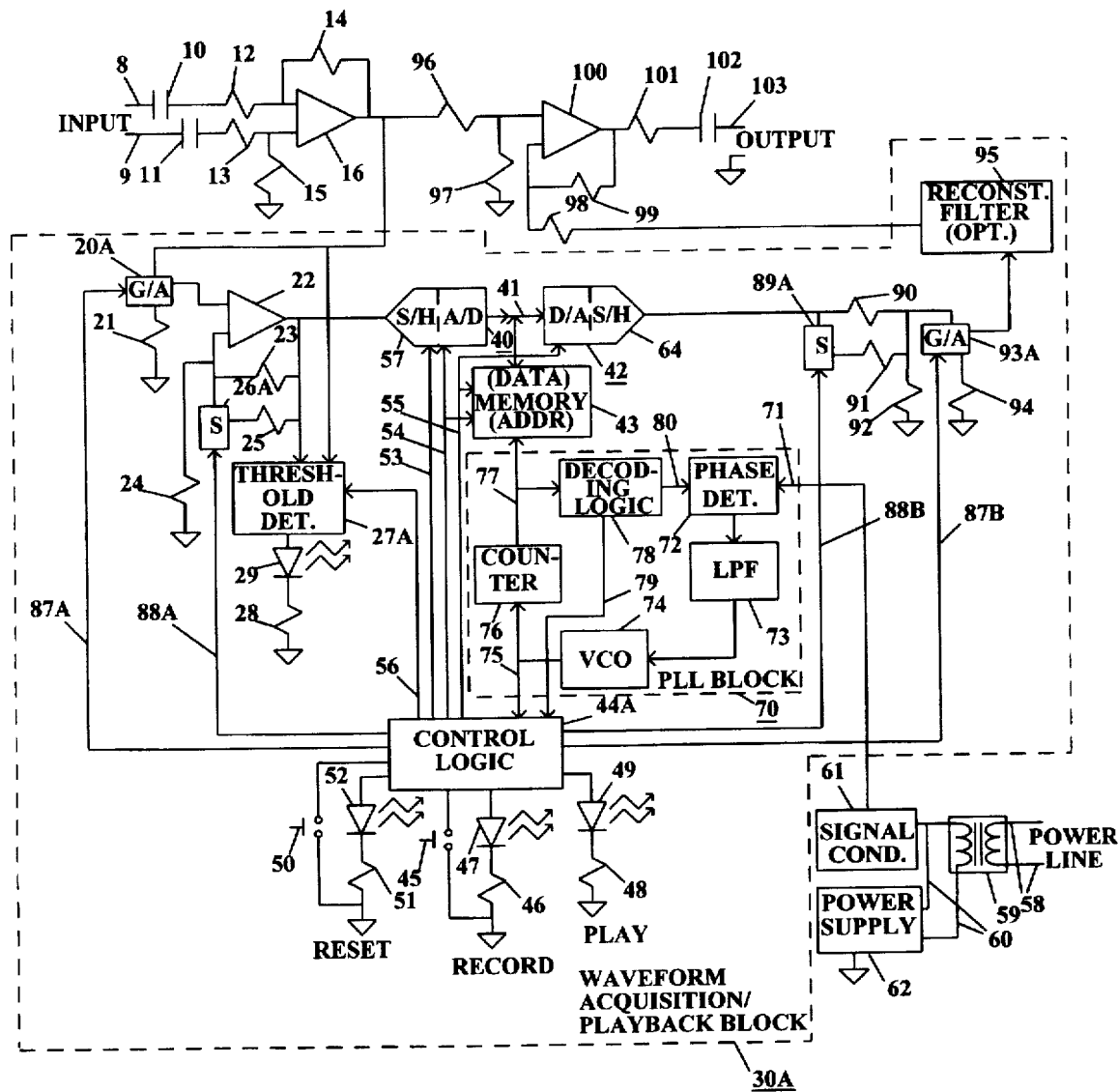
FIG. 4 is a block diagram of an alternate embodiment of the device, in which gain/attenuation scaling into and out of the waveform acquisition/playback block is accomplished automatically.

FIG. 4 shows an implementation in which manually-adjusted potentiometers 20 and 93, switches 26 and 89, and linkages 87 and 88 are replaced by gain/attenuation blocks 20A and 93A, switch blocks 26A and 89A, and control busses 87A, 87B, 88A, and 88B which are automatically set by the control logic 44A. Threshold detector 27A includes a binary output signal to control logic 44A: over/under threshold signal 63.

Gain/attenuation blocks 20A and 93A are commonly found in the forms of motorized potentiometers, light emitter/light-sensitive resistor combinations, voltage- or current-controlled resistors, voltage- or current-controlled amplifiers, MDAC's (multiplying digital-to-analog converters), and "digital potentiometers" (usually monolithic integrated circuits containing switched-resistor voltage dividers, controlled via pulsed "UP" and "DOWN" inputs) as well as in other forms.

Switch blocks 26A and 89A are commonly found in the forms of solenoid switches, relays, and semiconductor switches (JFET, MOSFET, CMOS, BJT, opto-isolators, etc.) as well as in other forms.

Each of the above block types has its own unique interfacing requirements and the specifics of control busses 87A and 88A may vary. The main idea in this embodiment is that the control logic 44A takes on the task of automatically setting the gain/attenuation blocks 20A and 93A and switch blocks 26A and 89A via control busses 87A and 88A after the "record" pushbutton 45 is pressed.

Automatic Gain Adjustment—Operation

The device is installed and used in the same manner and under the same circumstances as described under Preferred Embodiment—Operation.

The main operational difference is that manual setting of a knob and/or switch is not required.

Once the device has been inserted into the signal path, the user temporarily silences the "desired" component of the signal, allowing only the noise signal to be heard. He then presses the record pushbutton 45. At this point, the control logic 44A increases the gain (or reduces the attenuation) of the gain/attenuation blocks 20A and 93A, allowing for threshold detector block 27A response time with each step, until it detects a threshold condition via the block. (It is not necessary for the input and output blocks to be adjusted simultaneously, although this would probably simplify interfacing in most cases.) Alternatively, gain adjustment could proceed by using a more aggressive algorithm, like "successive approximation." If the control logic 44A reaches the end of the gain/attenuation blocks' 20A and 93A range without over/under threshold signal 63 indicating an over threshold condition, it opens the range switch blocks 26A and 89A and tries again. Once the over/under threshold signal 63 indicates over threshold, the control logic 44A backs down a step, and the optimum setting has been reached. (Alternatively, a slightly different design could employ an "optimum threshold" detector, in which case "backing down a step" would become unnecessary.)

With the gain/attenuation blocks 20A and 93A and switch blocks 26A and 89A properly set, the device then proceeds to acquire the noise waveform as described under Preferred Embodiment. When waveform acquisition is complete, the device automatically switches to "play" mode and continuously replays the stored waveform, canceling the noise signal as described under Preferred Embodiment.

At this point, the user may turn the "desired" signal back on and proceed with his work. If at any time conditions change and correlated noise is once again present, he may simply repeat the above procedure.

Microprocessor- or Microcontroller-Based—
Description

Figure 5:
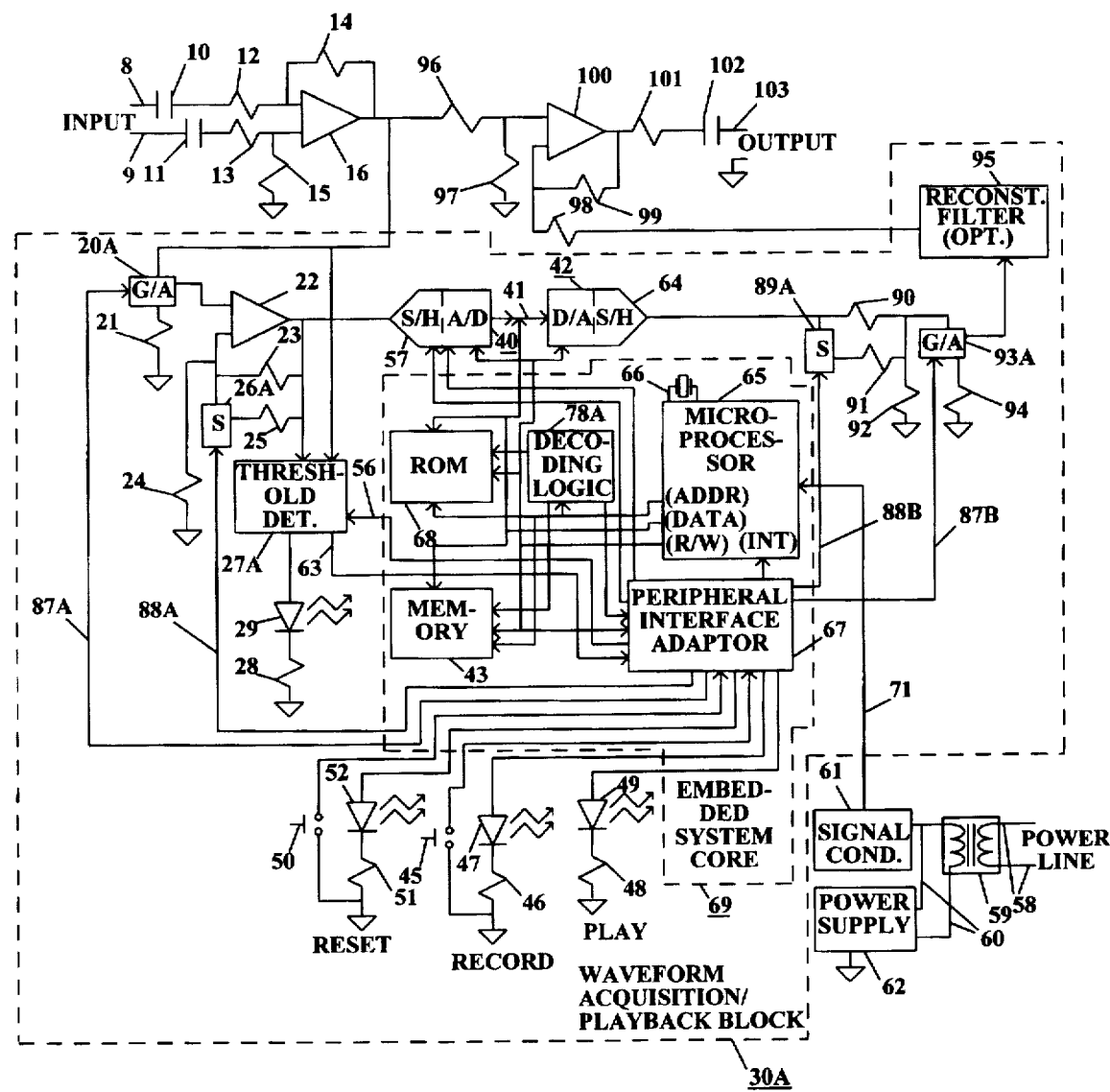
FIG. 5 is a block diagram of an alternate embodiment in which gain/attenuation scaling, control, and synchronization functions for the device are effected by a microprocessor- or microcontroller-based embedded system core.

FIG. 5 shows an implementation in which the waveform acquisition/playback block 30B is implemented using a microprocessor- or microcontroller-based embedded system core 69. The implementation of these so-called embedded systems is familiar to those practiced in the art.

It is anticipated that this alternate embodiment of the waveform acquisition/playback block 30B could implement the manually- or automatically-adjusted devices described above. Because it is more complex, the automatically-adjusted device will be considered here.

The read-only memory (ROM) 68 of the embedded system core 69 stores the program which implements the automatic gain adjustment and waveform acquisition/playback functions including pushbutton press detection; indicator control; state control; power line synchronization; analog-to-digital converter, memory, and digital-to-analog converter control. More sophisticated microcontroller chips 65 might even take on more functions (ex. analog-to-digital and/or digital-to-analog converter) internally.

Microprocessor- or Microcontroller-Based—
Operation

Figure 6A:
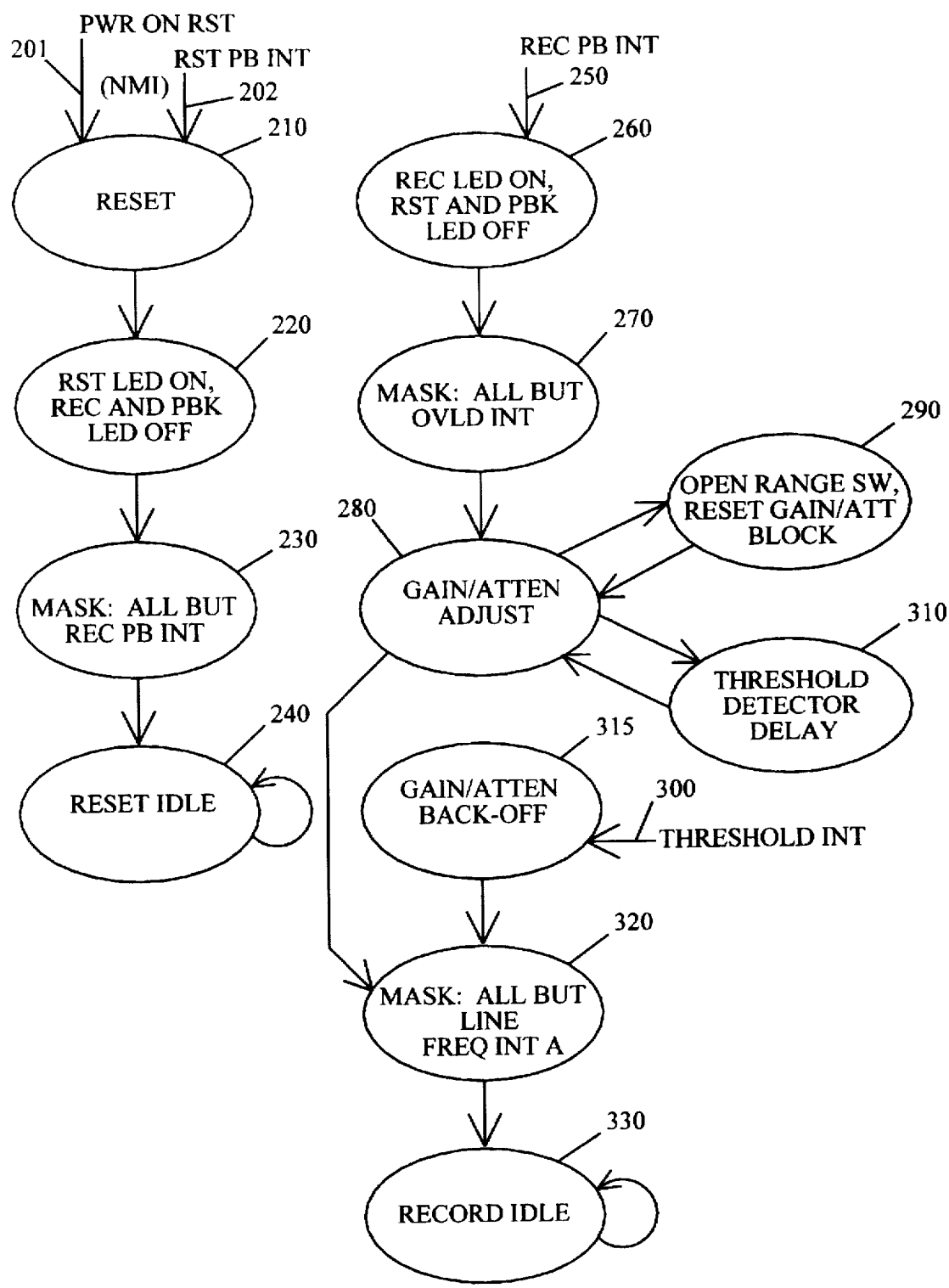
FIGS. 6A, B shows a possible state diagram for the program run by the embodiment of FIG. 5.
Figure 6B:
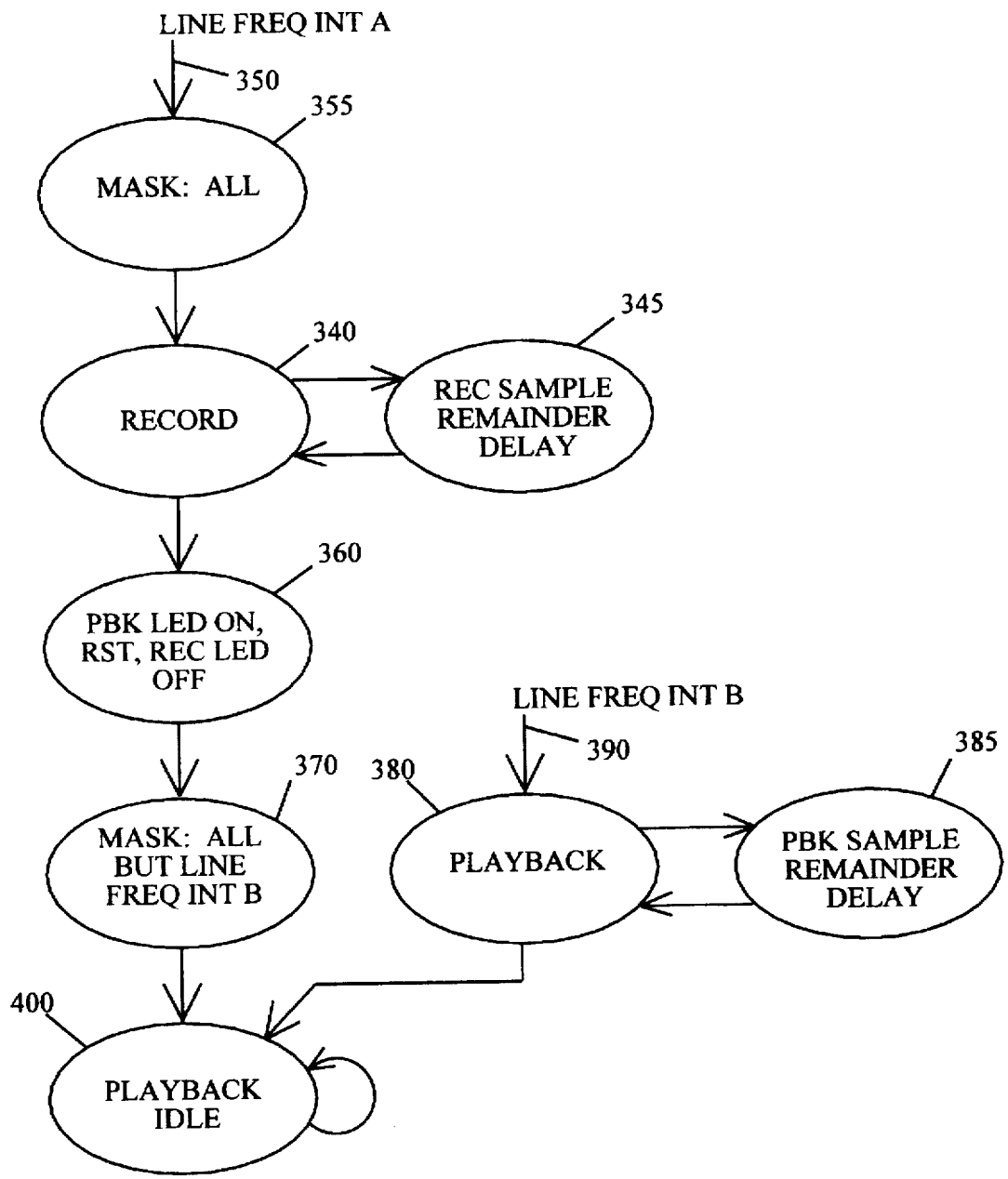

FIGS. 6A, B shows a high-level state diagram of the embedded system core's stored program.

The reset pushbutton interrupt 202 (RST PB INT) occurs when the reset pushbutton 50B (of FIG. 5) is pressed.

Upon detection of a (non-maskable) power-on reset interrupt 201 or (non-maskable) reset pushbutton interrupt 202 the program enters state 210, resetting the microcontroller's internal registers and peripherals, along with peripherals external to the microcontroller. It then proceeds to state 220, where it turns the reset LED 52 and the record LED 47 on and playback LED 49 off. Next, in state 230, the program unmasks the record pushbutton interrupt 250, leaving all other (maskable) interrupts masked. Then it proceeds to reset idle state 240.

The record pushbutton interrupt 250 (REC PB INT) occurs when the record pushbutton 45B (of FIG. 5) is pressed.

When the record pushbutton interrupt 250 occurs, the program jumps to state 260, turning the record LED 47 on and the reset and playback LED's 52, 49 off. Next, in state 270, it unmasks threshold interrupt 300, leaving all other (maskable) interrupts masked. It then proceeds to the gain/attenuation adjustment state 280, where it incrementally raises the gain (reduces the attenuation) from minimum (maximum), each time looping through state 310 to give the threshold detector enough time to cause a threshold interrupt 300. If the program via state 280 reaches the end of the gain/attenuation blocks' range without a threshold interrupt 300 it proceeds to state 290, where it opens the range switch blocks 26A and 89A, resets the gain/attenuation blocks 20A and 93A, and returns to state 280 to try again. If the program via state 280 reaches the end of the gain/attenuation blocks' range again without a threshold interrupt 300 it proceeds to state 320 with maximum achievable gain (or minimum achievable attenuation).

If a threshold interrupt 300 occurs, the program jumps to state 315, where it reduces the gain (increases the attenuation) a step to bring the noise signal below the threshold. It then proceeds to state 320, where it unmasks line frequency interrupt A 350, leaving all other (maskable) interrupts masked. It then proceeds to record idle state 330.

When line frequency interrupt A 350 occurs, the program masks all interrupts in state 355. It then proceeds to record state 340, where it generates all the control signals necessary to acquire and store the first sample, then proceeds to state 345 to wait the remaining time before returning to record state 340 for the next acquisition. This cycle continues until the requisite number of samples have been acquired. In effect, the program generates a "free-running" crystal-controlled record sample clock who's first "tick" is synchronized to the power line interrupt.

When the requisite number of samples have been acquired, the program proceeds to state 360, where it turns the playback LED 49 on and the reset LED 52 and record LED 47 off. It then proceeds to state 370, where it unmasks line frequency interrupt B 390, leaving all other (maskable) interrupts masked. It then proceeds to playback idle state 400.

When line frequency interrupt B 390 occurs, the program jumps to playback state 380, where it generates all the control signals necessary to recall and output the first sample, then proceeds to playback sample remainder delay state 385 to wait the remaining time before returning to playback state 380 for the next sample playback. This cycle continues until the requisite number of samples have been played back, or line frequency interrupt B 390 occurs again, whichever comes first. If the requisite number of samples is played back before line frequency interrupt B 390 occurs, the program proceeds to playback idle state 400 and awaits the interrupt.

This scheme synchronizes the "free-running" crystal controlled sample clock generated by the program to the power line frequency. Though technically not a phase-locked loop, because there is no feedback of a synthesized line-frequency signal to a phase comparator, for a line frequency sufficiently close to nominal the crystal clock will ensure that the requisite N samples (±1 sample, approximately) are recorded and played back in an approximation of a sample rate which is an integral multiple of the line frequency, thereby achieving cancellation of the interference signal.

A more accurate approach contemplated would involve measuring and adapting to a varying period between successive occurrences of line frequency interrupt B 390. This could become important in applications where frequency stability of the AC power source in use is less certain, for instance, when using portable power generation. In this case, the playback idle state 400 would have a means for measuring the amount of time spent in that state. Likewise, the playback state 380, upon entry, would have a means for determining the number of samples unplayed at its last invocation or the amount of time measured in the last invocation of playback idle state 400, and adjust the playback sample remainder delay state 385 accordingly. It is anticipated that if only the frequency of the AC line (thus the interference signal) were to vary over a considerable range, the interference signal's relative phase and amplitude-vs.-phase would nevertheless remain constant enough for a user to still derive substantial benefit from the device.

Conclusions, Ramifications, and Scope

Accordingly, it can be seen that I have provided an electronic device for removing the power-line correlated noise component from an audio signal without the audible side-effects, potential safety hazards or cost associated with other methods. The device employs a "feed-forward" topology which makes it suitable for use with low- or high-impedance sources. It also features a unique variable gain scaling configuration which enables the device to capture and correctly play back a wide range of noise signal amplitudes and still make full use of the limited dynamic range of the acquisition/playback block. The only limitation of this device over devices employing other methods is that it assumes that the noise will remain relatively constant in phase and amplitude over the period of interest. This is a good assumption in many real-world applications.

Although the description above contains many specificities, these should not be construed as limiting the scope of the invention but as merely providing illustrations of some of the presently preferred embodiments of this invention. Various other embodiments and ramifications are possible within it's scope. For example, the device could be built into a larger system, for instance, into a guitar amplifier, into a compressor, or in the preamplifier stage of each channel of a mixing board. With essentially the same topology but different specifics as to components, levels, sample rates, record length, resolution, bandwidth, and input signal conditioning, this device could find use "standalone" or integrated in other applications such as broadcast television audio and radio, telephone, public address, home stereo and home theater, video equipment and monitors, computer monitors, industrial controls, instrumentation, portable power applications where generators or inverters must be used with sensitive equipment. Creative application of this device could lower the degree of voltage regulation demanded of a system's power supply, thus lowering overall system costs.

Thus the scope of the invention should be determined by the appended claims and their legal equivalents, rather than by the examples given.

What is claimed is:

1. A system for canceling an unwanted noise signal while preserving a desired signal having the same frequency, said system comprising:

a) a waveform acquisition/playback block with integral interconnected sample recording, N-unit storage, and sample playback means, integral threshold detector means connected at sampling circuit input within said block, and electrically or mechanically ganged gain/attenuation adjustment means with complimentary gain/attenuation characteristics connected at input and output of said block for simultaneously adjusting the input and output of said block to a correct amplitude whereby the greatest use and economy of limited dynamic range of said block is realized;

b) an address means, said address means having N positions and being operable in synchronism with said noise signal;

c) a control logic circuit coupled to said waveform acquisition/playback block and address means to enable said block at selected times to store the instantaneous values of said noise signal, enable said block at other times to play back the stored instantaneous values of said noise signal, and to manually or automatically simultaneously scale the input and output of said block using said gain/attenuation adjustment means to the correct amplitude with reference to said threshold detector means prior to acquisition of said noise signal;

d) a feedforward circuit whereby said acquired noise signal is summed inverted with respect to said unwanted noise signal superimposed on said desired signal during operation.

2. The system of claim 1 wherein said noise signal comprises power line interference.

3. The system of claim 1 wherein said storage means are digital storage means.

4. The system of claim 1 wherein said storage means are analog storage means.

5. The system of claim 1 wherein said gain/attenuation adjustment means are automatically adjusted by said control logic circuit.

6. The system of claim 2 wherein said gain/attenuation adjustment means are automatically adjusted by said control logic circuit.

7. The system of claim 3 wherein said gain/attenuation adjustment means are automatically adjusted by said control logic circuit.

8. The system of claim 4 wherein said gain/attenuation adjustment means are automatically adjusted by said control logic circuit.

9. A method for canceling an unwanted noise signal having a relatively fixed frequency and phase, while preserving the frequency, phase and transient characteristics of a desired signal containing the same frequency, said method comprising:

a) simultaneously adjusting the gain/attenuation at the input and output of a waveform acquisition/playback means using an electrically or mechanically ganged gain/attenuation adjustment means, when only said noise signal is present and with aid of a threshold detector means;

b) sampling said noise signal at N preset intervals when only said noise signal is present, whereby the greatest use and economy of limited dynamic range of said waveform acquisition/playback means is realized during sampling by virtue of step (a);

c) separately storing the values obtained during said sampling;

d) discontinuing said sampling; and e) retrieving the stored signals and combining the retrieved signals with the desired signal to cancel the unwanted noise.

10. The method of claim 9 in which said sampling is phase-correlated to the noise signal.

11. The use of a method for non-adaptively canceling in an audio signal an unwanted noise signa having a relatively fixed frequency and phase, while preserving the frequency, phase and transient characteristics of a desired signal containing the same frequency, said method comprising:

a) simultaneously adjusting the gain/attenuation using electrical or mechanical ganged volume controls with complimentary gain/attenuation characteristics at the input and output of a waveform acquisition/playback means, whereby the greatest use and economy of limited dynamic range of said block is realized, said adjusting occurring when only said noise signal is present and with aid of a threshold detector means;

b) sampling said noise signal at N preset intervals when only said noise signal is present, whereby the greatest use and economy of limited dynamic range of said waveform acquisition/playback means is realized during sampling by virtue of step (a);

c) separately storing the values obtained during said sampling;

d) discontinuing said sampling; and e) retrieving the stored signals and combining the retrieved signals with the desired signal to cancel the unwanted noise.

* * * * *